United States Patent [19]

Wiley

[11] Patent Number: 4,654,666
[45] Date of Patent: Mar. 31, 1987

[54] PASSIVE FREQUENCY SCANNING RADIOMETER

[75] Inventor: Carl A. Wiley, Los Angeles, Calif.

[73] Assignee: Hughes Aircraft Company, Los Angeles, Calif.

[21] Appl. No.: 651,124

[22] Filed: Sep. 17, 1984

[51] Int. Cl.$^4$ ............................................. G01S 3/02
[52] U.S. Cl. ................................ 342/351; 324/77 C; 342/375
[58] Field of Search ............. 343/351, 375; 324/77 B, 324/77 CS, 105, 77 C

[56] References Cited

U.S. PATENT DOCUMENTS

| | | | |
|---|---|---|---|
| 3,438,035 | 4/1969 | Fling et al. | 343/375 |
| 3,646,559 | 2/1972 | Wiley | 343/375 |
| 3,743,942 | 7/1973 | Carpenter | 324/77 CS |
| 3,808,596 | 4/1974 | Kazel | 343/351 |
| 4,484,356 | 11/1984 | Geesen et al. | 324/77 C |

Primary Examiner—Theodore M. Blum
Assistant Examiner—D. Cain
Attorney, Agent, or Firm—J. A. Sawyer, Jr.; M. J. Meltzer; A. W. Karambelas

[57] ABSTRACT

A passive imaging system (400) includes a frequency scanning array (412) for receiving radiation emissions from a scene with a flat or known spectrum of emissions over the operating frequency of the array. Different beam directions are addressed by a spectrum analyzer (404). An image coordinate generator (410) may be used where necessary to normalize the image which may be stored or displayed by an appropriate device (406).

In one embodiment, the array is planar so as to generate pencil beams. The planar array comprises parallel line-source antenna elements (402), with a common feed (414). The feed has a large "wrap-up" so that frequency-frequency scanning is employed.

Alternatively, one-dimensional images can be effected with a single line-source frequency scanning antenna element. Also, one-dimensional frequency scanning may be supplemented by a different scanning approach for resolution orthogonal to that provided by the frequency scanning. In one embodiment, phase gradient scanning is employed.

11 Claims, 7 Drawing Figures

PASSIVE FREQUENCY SCANNING RADIOMETER

BACKGROUND OF THE INVENTION

The present invention relates to radiometers and, more particularly, to radio frequency radiometers.

In applications, such as satellite meteorology, requiring high resolution imaging of distant scenes, antenna bulk and power requirements are at a premium. This is especially true where radio frequency imaging is used, for example, to provide continuous observation despite cloud coverage. Many such applications have requirements exceeding the available operational capabilities of active imaging systems, e.g. radar.

For these reasons, a practical passive or radiometric imaging system is desired which operates at radio frequencies. Preferably, such a system would employ electronic scanning, since electronic scanning is not as power demanding as mechanical scanning.

Electronic scanning may involve phase gradient or time delay scanning, but these approaches are problematic in that the narrow bandwidths employed limit the power available for imaging to a small fraction of that actually arriving at the antenna. Broader bandwidth phase gradient and delay scanning systems encounter problems, such as those induced by a phenomenon known as frequency scanning, which causes the directionality of an antenna to shift as a function of frequency.

Some radar systems employ frequency scanning to advantage. For example, a travelling wave array is used as a frequency scanning line source transmit/receive antenna. A set of these arrays mounted side-by-side produces a scanning planar array. The planar array produces a scanning pencil beam, providing for a pixel-by-pixel reconstruction of the reflectivity distribution of a scene. A microwave transmitter changes the antenna beam direction by changing the input frequency.

In the frequency scanning radar, the receiver frequency tracks the transmitter frequency. The transmit and receiver beam have a common boresight. Target reflections produced by the transmit beam are therefore received with full sensitivity by the receive beam.

It would be desirable to use frequency scanning as an electronic scanning approach in passive systems. However, the control over operational frequency is lost, as is the predetermined common boresight, when target emission rather than reflected transmissions are being received. Furthermore, the emitters from radiometric scenes are noncoherent. For these reasons and others, heretofore, practical frequency scanning radiometers have not been developed.

SUMMARY OF THE INVENTION

In accordance with the present invention, frequency scanning is applied in a radiometric imaging system. A radio frequency radiometer incorporates a frequency scanning antenna, the output of which is processed by a spectrum analyzer. The output of the spectrum analyzer can be stored or displayed as desired. In some embodiments, the output of the spectrum analyzer is transformed by an image coordinate generator prior to display. The radiometer is adapted for reconstructing an image of a scene of noncoherent thermal emitters whose spectra are flat or known over the frequency range of the antenna.

In some realizations of the invention, frequency scanning provides resolution in one-dimension. Accordingly, a one-dimensional radiation distribution may be obtained. Alternatively, means may be provided for resolving in an orthogonal direction to provide two-dimensional images. This means may involve mechanical motion or electronic scanning, e.g. by differential phase gradients. In an alternative realization of the invention, two-dimensional frequency-frequency scanning of a pencil beam is provided. Generally, two-dimensional imaging can be provided for by parallel linear arrays with a frequency or phase gradient scanning common feed.

In accordance with the foregoing, and the detailed description below, an improved radiometer provides for practical imaging using passive frequency scanning. The radiometer provides for relatively low power, low bulk, continuous imaging by meteorological satellites. Many other applications and advantages are apparent from the following description.

DESCRIPTION OF THE PREFERRED EMBODIMENTS

Figure 1:
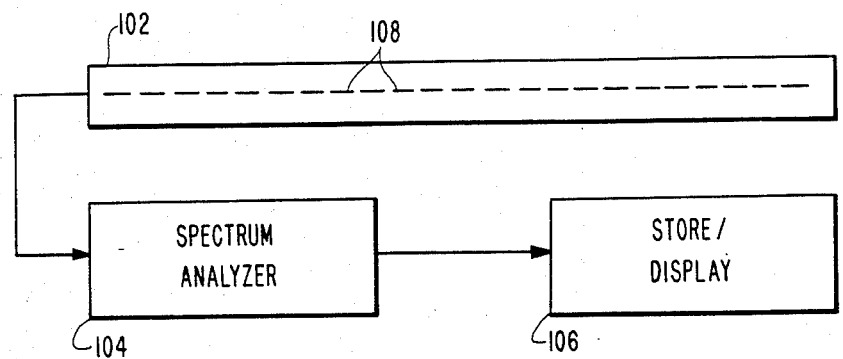
FIG. 1 is a schematic of an imaging system in accordance with the present invention.
Figure 2:
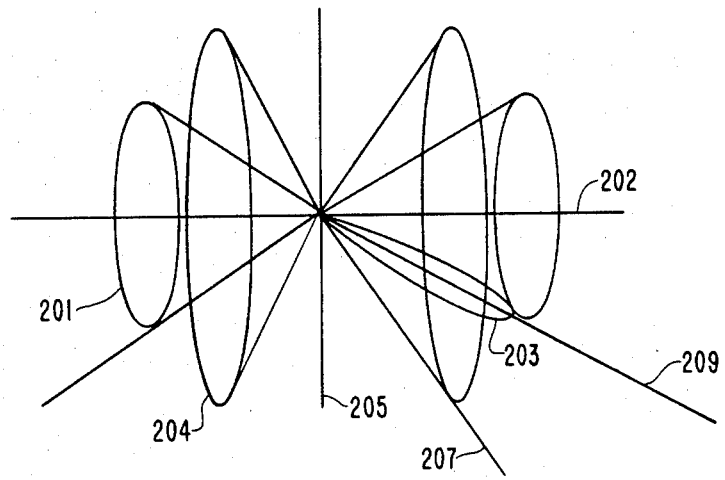
FIG. 2 depicts the beam patterns of some embodiments of the present invention.
Figure 3:
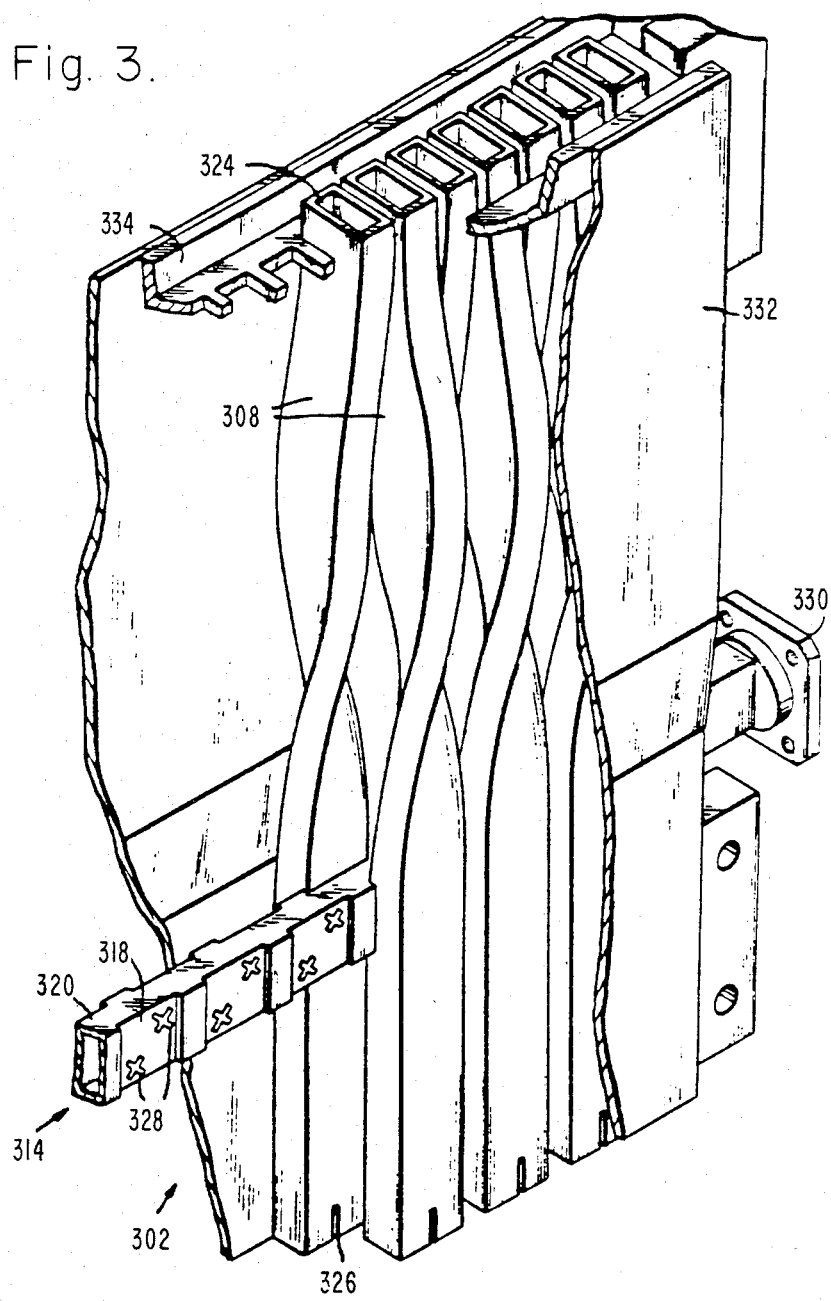
FIG. 3 is an antenna incorporable in an imaging system, such as that of FIG. 1.
Figure 4:
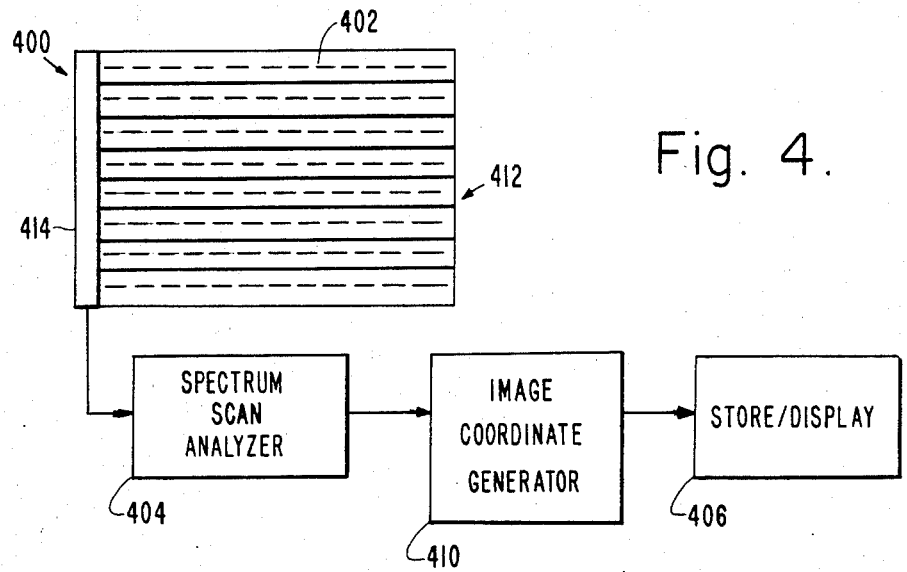
FIG. 4 is a frequency×frequency scanning imaging system in accordance with the present invention.

In accordance with the present invention, an imaging system 100 comprises a frequency scanning antenna 102, a spectrum analyzer 104, and a store/display device 106, as illustrated in FIG. 1. The antenna generates conical fanbeams, such as the fanbeams 201 illustrated in FIG. 2, and is constructed as indicated in FIG. 3. In alternative embodiments, such linear arrays may be arranged side-by-side, as in the systems 400 and 500, illustrated in FIGS. 4 and 5, to form planar arrays 412 and 512 which generate pencil beams such as the pencil beam 203 illustrated in FIG. 2.

The frequency scanning antenna 102 may be considered a waveguide with multiple slots 108. Since the wavelength of the energy travelling down the antenna varies with frequency, the relative phase of the energy radiated from the slots 108 varies also. At a frequency corresponding to a wavelength equal to the slot spacing, the energy combines in the far field to form a maximum in the broadside direction 205, i.e. perpendicular to the axis 202 along which the antenna lies. At frequencies other than multiples of the fundamental broadside frequency, the phases in each slot are shifted relative to every other slot so that the energy forms a maximum only in another direction, 207, 209 at some offset angle. Thus, the maximum varies smoothly as a function of frequency.

Where a scene radiates energy with a flat or known spectrum over the operating bandwidth of the antenna, the spectrum of the antenna output can be analyzed to provide a radiation distribution of the scene. The illustrated imaging system 100 is adapted for microwave imaging of terrain from a satellite. Since the terrain consists of noncoherent thermal emitters radiating energy over a wide band of frequencies, the output of the antenna provides a radiation distribution for the terrain below.

In the linear array imaging system 100, the output of the antenna 102 is a frequency coded radiation distribution of a scene. The spectrum analyzer 104 converts this to a time-coded radiation distribution of the scene. The store/display device 106 then plots the time function to produce the desired one-dimensional "space-coded" radiation distribution of the scene. Two-dimensional images can be reconstructed from multiple one-dimensional radiation distributions.

An imaging system 400 incorporates a planar array 412 to provide for pixel-by-pixel assembly of two-dimensional images. The planar array 412 comprises parallel frequency scanning line source antenna elements 402 with a common feed 414. Frequency scanning is used along the direction of scan of the parallel antenna elements 402.

In the illustrated implementation of system 400, frequency scanning is used in the orthogonal direction as well. The frequency-frequency scanning system 400 uses an antenna array such as the antenna array 612, illustrated in FIG. 6. A portion 601 of the array 612 is shown enlarged in FIG. 6. Alternatively, phase gradient scanning is used in the orthogonal direction as in the phase-frequency scanning system 500 illustrated in FIG. 5.

In some embodiments, the output of the spectrum analyzer 404 is displayed directly. However, because scanning patterns may distort the scene, an image coordinate generator 410 is used in the imaging system 400 to normalize the scene. The image coordinate generator function may be built into the display device 406, for example, by adjusting the sweep pattern in a cathode ray tube (CRT).

The frequency-frequency scanning array 612 uses a feed 614 in the form of a double helix to provide a very large frequency wrap-up relative to the line-source elements 602. The large wrap-up results in very "slow" frequency scanning along the feed 614 relative to the scanning along the individual antenna elements 602. The antenna elements 602 are curved at their feed ends 640 to enhance coupling with the feed 614.

Figure 7:
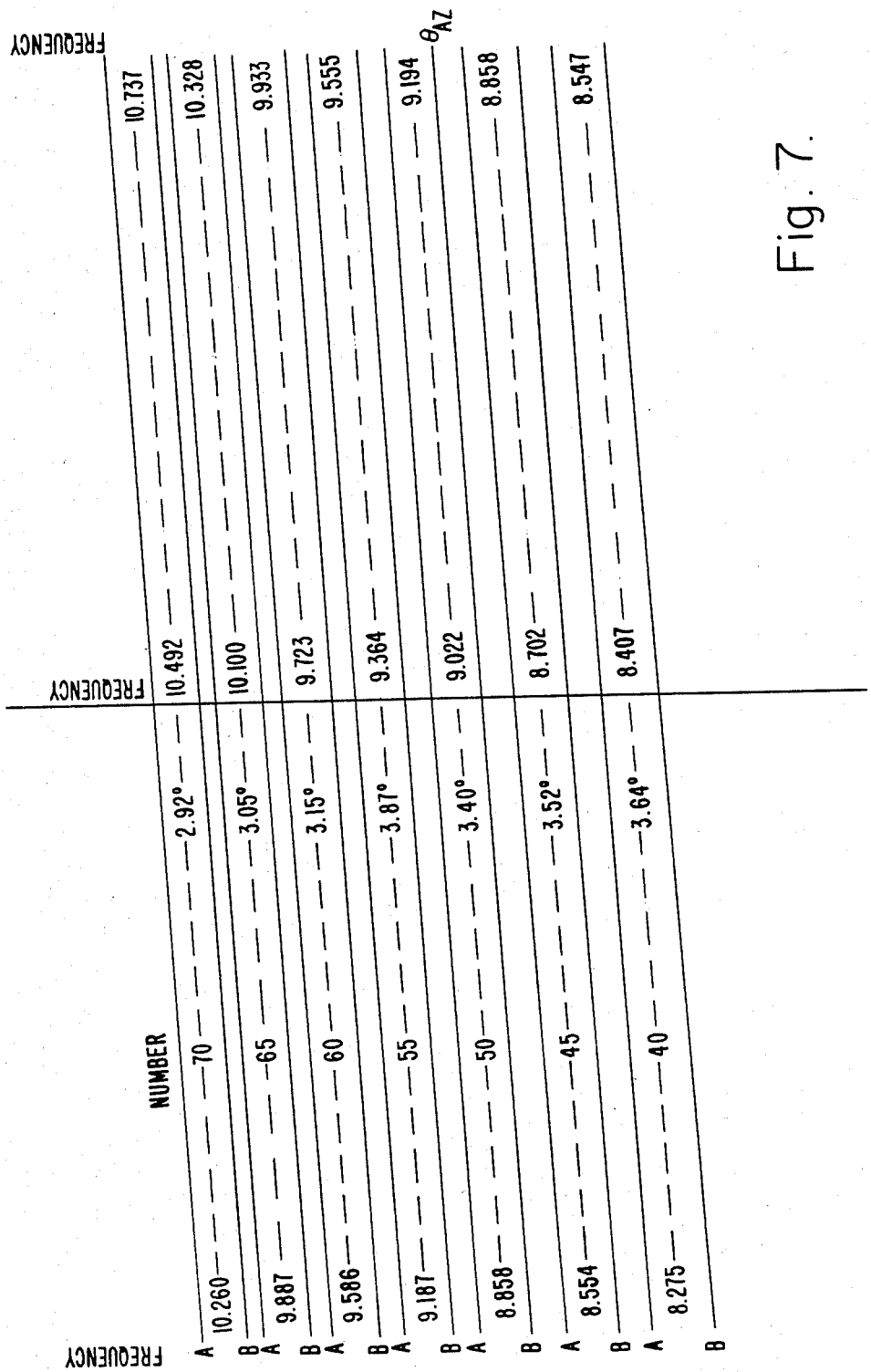
FIG. 7 is a scan pattern of the antenna of FIG. 6.

Thus, pencil beam position changes rapidly as a function of frequency along the direction of the antenna elements 602, and slowly in the direction of the feed 614. For thorough coverage, the beam travel in the feed direction should be at most one beam width per complete scan in the individual element direction. Practically, one-half beamwidth feed direction travel per antenna element scan provides optimal resolution. In the illustrated embodiment, a one-beam width per scan design is employed, with overlapping beams provided by the double helix feed. The contributions of the individual helical feeds are indicated in FIG. 7 by A's and B's, respectively.

The output of the spectrum analyzer 404 is normalized by the image coordinate generator 410. The normalization is achievable with a CRT display 406 having appropriately skewed raster scans. The raster scans may be interlaced where a double-helix feed, such as 614, is used.

Figure 5:
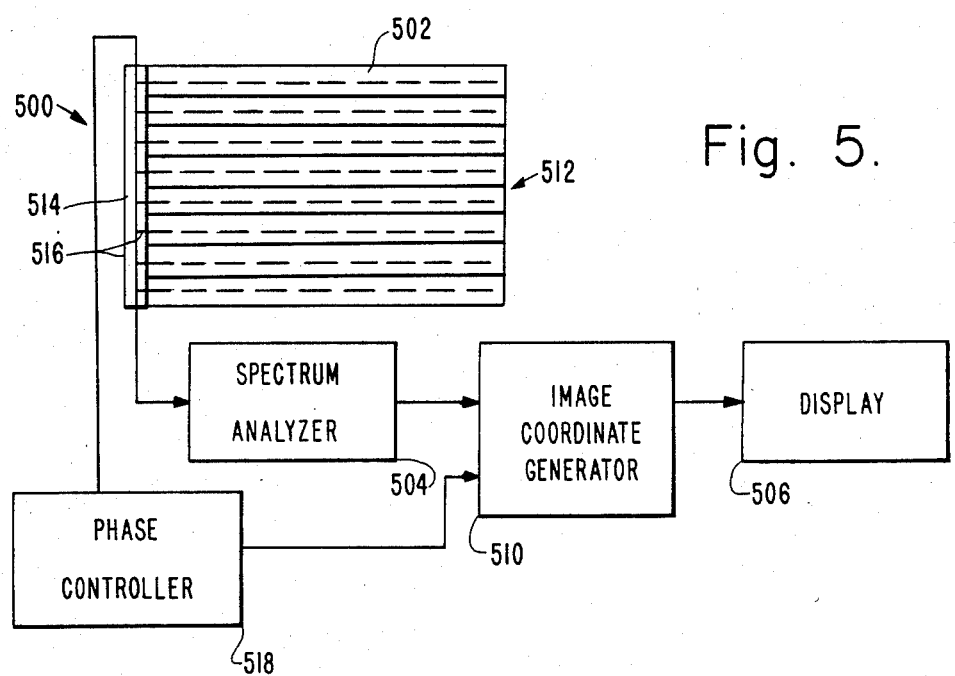
FIG. 5 is a phase-gradient×frequency scanning imagning system in accordance with the present invention.
Figure 6:
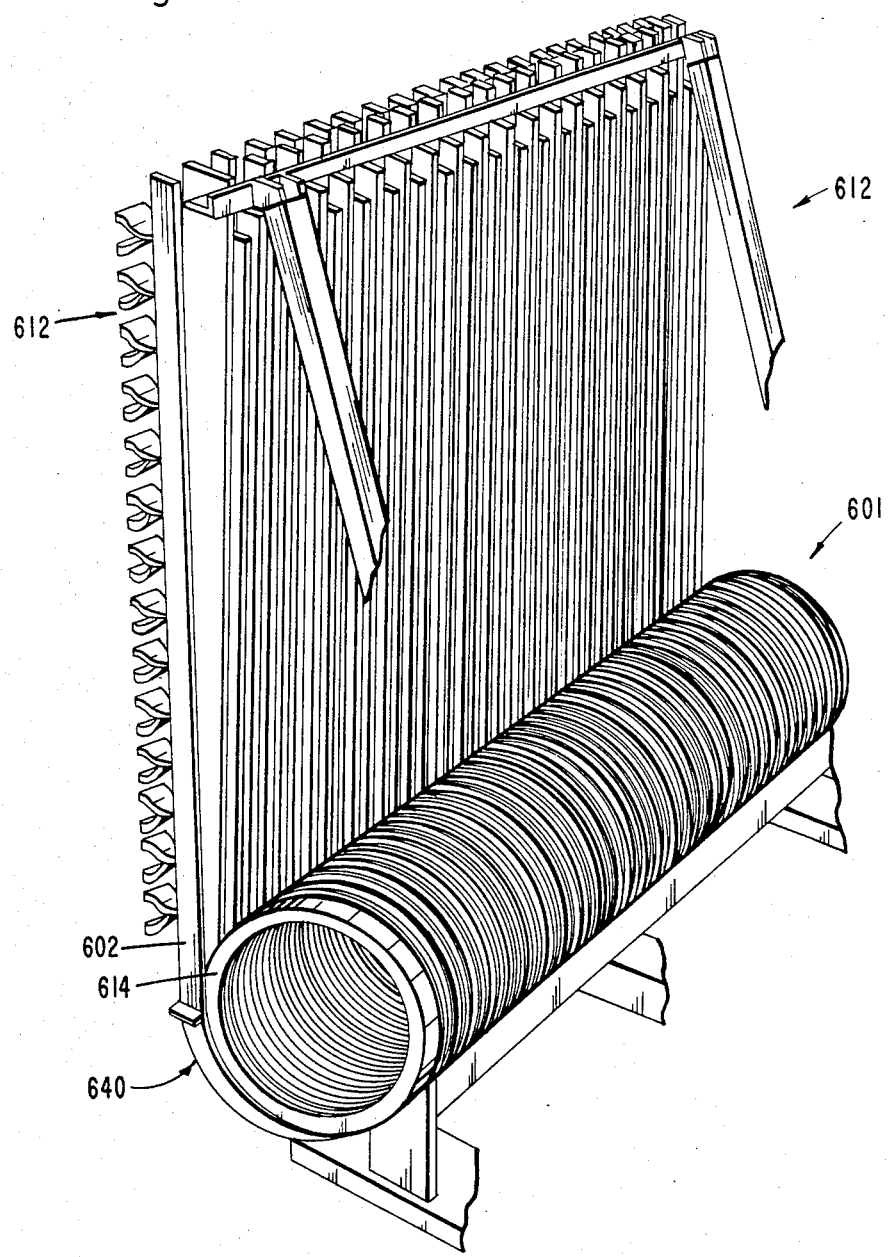
FIG. 6 is an antenna incorporable in an imaging system such as that of FIG. 4.

Phase gradient scanning in the feed direction is utilized in the imaging system 500 of FIG. 5. Variable phase shifters 516 are inserted at the feed ends of each of the antenna elements 502. A phase controller 518 adjusts the phase shifters 516 in parallel. At any given time, the phase controller 518 dictates a particular phase for the phase shifters 516. The output of the array 512 represents the radiation received along the series of pencil beams associated with the given phase. In alternate embodiments, phase gradient scanning is provided by planar arrays fed by a Rotman Lens or a "tin hat Luneberg" with feeds along their focal arcs.

The positional data along the scan strip dictated by a given phase is converted from frequency-coded data to time-coded data by the spectrum analyzer 504. The time-coded distribution output of the spectrum analyzer can be coordinated with information on the phase setting by an image coordinate generator 510. The coordination can be effected by having the phase determine a raster setting on a CRT display device 506, and using the output of the spectrum analyzer to determine the distribution along that raster line. A two-dimensional radiation distribution of the scene can be constructed, raster by raster, as phase is shifted to span the scene in the feed direction.

In the illustrated frequency scanning antenna 302, which is similar to the one employed in system 100, one feed 314 is employed. Alternatively, two or more feeds could be used. The illustrated feed 314 has a rectangular cross-section to support only a $TE_{01}$ mode. This means zero resonances parallel to the broad walls 318 and one resonance mode parallel to the narrow walls 320. In other embodiments, other modes, cross-sections and feed structures are possible; e.g. rigid coaxial transmission line could be used.

The illustrated radiating elements 308, corresponding to the slots 108 in FIG. 1, are also rectangular waveguides. Alternatively dipoles or other structures could be used. The radiating elements 308 are twisted so that they align with their broad walls adjacent at their radiating ends 324, and with narrow walls adjacent at the feed 314 and at the ends with loads 326.

The radiating elements 308 are staggered above and below the feed 314 for compactness and to achieve an $M=\frac{1}{2}$ scan mode. This mode is accomplished since the staggering makes the signals received by the feed 314, from adjacent radiating elements, 180° out of phase.

The $M=\frac{1}{2}$ scan mode is desired so that the broadside field of view can be spanned. Without staggering or an alternative phase shifting technique, the $M=0$ mode would prevail, and only the forward half of the broadside field-of-view would be scanned.

Coupling between the radiating elements 308 and the feed 314 is provided by Moreno couplers 328 in the form of cross shaped holes. These couplers 328 are selected for their broad bandwidth capabilities, required by the frequency scanning antenna. The couplers 328 are arranged to couple the paths between the radiating ends 324 and feed port 330 and the paths between the radiating element loads 326 and the feed load (not shown) so that direction signals are received at and reflections are diverted from the feed port 330.

The loads 326 at the ends of the radiating elements and the feed load absorbs unwanted power from reflections in a manner well known in the art. In addition, structural elements 332 providing support, rigidity and protection from space radiation or other environmental factors, are employed according to the intended application. The radiating end of antenna 302 includes a trough 334 to damp surface waves and to prevent their coupling to the radiating elements and causing beam dropouts. The beam dropouts would show up as beam holes in the antenna output, and hence the microwave spectrum. Alternatively, dielectric plates, could be placed over the radiating element ports.

In accordance with the above, several embodiments of the present invention have been presented with advantages over the prior art. Many variations and modifications of the above embodiments are within the ken of one ordinarily skilled in the art. For example, different operating frequency ranges, beam shapes and methods of analysis can be employed. These and other embodiments are within the scope of the invention as claimed.

What is claimed is:

1. A radiometer for reconstructing the radio frequency distribution of a scene of noncoherent thermal emitters comprising:
    an antenna for forming sensitivity beams collectively spanning said scene, each sensitivity beam having a position addressable as a function of frequency, said antenna producing an output in response to said scene, the output being a coded radiation distribution of the scene;
    a spectrum analyzer for receiving the output of said antenna and for converting the coded radiation distribution to a time-coded distribution of the scene and;
    means for producing a one dimensional radiation distribution of the scene from the time coded distribution so that a reconstruction of said scene can be produced.

2. The radiometer of claim 1 in which the producing means comprises an image coordinate generator for normalizing the output of said spectrum analyzer to provide an accurate representation of said scene and a display means coupled to the image coordinator for providing the representation of the scene.

3. The radiometer of claim 1 further characterized in that said sensitivity beams are conical fanbeams and in that said reconstruction is one-dimensional.

4. The radiometer of claim 1 further characterized in that said sensitivity beams are conical fanbeams, in that means are provided for resolving orthogonal to said fanbeams, and in that said reconstruction is two-dimensional.

5. The radiometer of claim 1 further characterized in that said sensitivity beams are pencil beams.

6. The radiometer of claim 5 further characterized in that said antenna is a planar array constituted by parallel linear arrays with a common linear feed so that the frequency range required for a complete scan in one coordinate direction results in multiple complete scans in an orthogonal coordinate direction.

7. The radiometer of claim 1 further characterized in that said antenna includes multiple fanbeam elements and means for introducing multiple phase gradients among said elements, said sensitivity beams being pencil beams, with positions addressable as functions of frequency and phase gradient.

8. A radiometer for reconstructing the radio frequency distribution of a scene of noncoherent thermal emitters comprising:
    an antenna for forming sensitivity beams that collectively span said scene, each of the sensitivity beams having a position addressable as a function of frequency, said antenna producing a output in response to said scene, the output of the antenna being a frequency coded radiation distribution of the scene;
    a spectrum analyzer for receiving the output of said antenna and for converting the frequency coded radiation distribution to a time coded radiation distribution of the scene;
    means coupled to the spectrum analyzer for normalizing the time coded radiation distribution; and
    means coupled to the normalizing means for providing an image of the scene.

9. The radiometer of claim 1 in which the normalizing means comprises an image coordinate generator.

10. A method for reconstructing the radio frequency distribution of a scene of noncoherent thermal emitters comprising the steps of:
    (a) forming a plurality of sensitivity beams that collectively span the scene
    (b) collectively producing a coded radiation distribution of the scene from the plurality of sensitivity beams;
    (c) converting the coded radiation distribution to a time coded radiation distribution of the scene; and
    (d) producing a one dimensional radiation distribution of the scene from the time coded radiation distribution of the scene.

11. The method of claim 10 further comprising the step of reconstructing the radio frequency distribution of the scene from the one-dimensional radiation distribution.

* * * * *